United States Patent
Tsuchiya et al.

(10) Patent No.: US 7,790,998 B2
(45) Date of Patent: Sep. 7, 2010

(54) VACUUM INSULATED SWITCHGEAR

(75) Inventors: Kenji Tsuchiya, Hitachi (JP); Masato Kobayashi, Hitachi (JP); Ayumu Morita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/213,515

(22) Filed: Jun. 20, 2008

(65) Prior Publication Data

US 2008/0308532 A1 Dec. 18, 2008

Related U.S. Application Data (63) Continuation of application No. 11/762,504, filed on Jun. 13, 2007.

(51) Int. Cl.
*H01H 33/66* (2006.01)

(52) U.S. Cl. .................. 218/120; 218/140; 218/154

(58) Field of Classification Search ............ 218/2–14, 218/43–45, 118–120, 140, 153, 154
See application file for complete search history.

(56) References Cited

U.S. PATENT DOCUMENTS

| | | | |
|---|---|---|---|
| 5,920,052 A | 7/1999 | Lee | |
| 6,118,257 A | 9/2000 | Biquez et al. | |
| 6,255,615 B1 | 7/2001 | Kimblin et al. | |
| 6,498,314 B2 * | 12/2002 | Miyo et al. | 218/118 |
| 6,518,531 B2 * | 2/2003 | Arioka et al. | 218/154 |
| 6,897,396 B2 * | 5/2005 | Ito et al. | 218/120 |
| 7,679,022 B2 * | 3/2010 | Tsuchiya et al. | 218/120 |

FOREIGN PATENT DOCUMENTS

| | | |
|---|---|---|
| DE | 39 15948 A1 | 5/1989 |
| DE | 43 12 620 A1 | 10/1994 |
| DE | 198 57 170 A1 | 6/2000 |
| EP | 1 020 970 A1 | 7/2000 |
| EP | 1 045 498 A2 | 10/2000 |
| EP | 1 271 589 | 1/2003 |
| EP | 1 361 633 | 11/2003 |
| EP | 1 005 058 | 5/2006 |
| GB | 1 329 725 | 9/1973 |
| GB | 2 252 672 | 8/1992 |
| GB | 2 284 307 | 5/1995 |
| JP | 9-153320 | 6/1997 |
| JP | 2003-240086 | 8/2003 |
| JP | 2005-108766 | 4/2005 |
| WO | WO 02/060027 | 8/2002 |

* cited by examiner

*Primary Examiner*—Edwin A. Leon
*Assistant Examiner*—Marina Fishman
(74) *Attorney, Agent, or Firm*—Mattingly & Malur, P.C.

(57) ABSTRACT

A vacuum insulated switchgear comprising a vacuum container accommodating at least a pair of movable contacts and a pair of fixed contacts, wherein the movable contacts are capable of taking three positions, the switchgear being a double-break three-position type switch having breaking and disconnecting functions.

3 Claims, 12 Drawing Sheets

VACUUM INSULATED SWITCHGEAR

This application is a continuation application of U.S. Ser. No. 11/762,504, filed Jun. 13, 2007.

TECHNICAL FIELD

The present invention relates to a vacuum insulated switchgear which is reduced in size and weight to have high capability and reliability.

BACKGROUND ART

In power receiving facilities, a closed type distributor (called a switchgear) is provided in which a vacuum circuit breaker for breaking load current or accident current, a disconnecting switch and earth switch for ensuring safety of an operator in maintaining the load, a detector for system voltage and current, a protection relay, and the like are contained.

There are various insulation methods for switchgears. Solid insulation, compressed air insulation, full vacuum insulation, and the like have appeared in recent years in view of environment, in addition to a conventional air insulation panel and cubicle GIS using SF6 gas. Downsizing of components of the breaker, disconnecting switch, and earth switch has been accelerating in various insulation methods. A switchgear (intensive type switchgear) in which a vacuum valve integrating circuit breaking, disconnecting, and earthing functions in a single container is stored in an insulation gas container, has been suggested (for example, see Patent Document 1).

[Patent Document 1] JP-09-153320-A

SUMMARY OF THE INVENTION

The above-described intensive type switchgear is such that a vacuum valve integrating circuit breaking, disconnecting, and earthing functions in a single container is stored in an insulation gas container. Therefore, for example, the intensive type switchgear can respond to needs for reduction in size and weight of electricity distributing facilities in urban areas.

On the other hand, requests of users of recent incoming transfer facilities have been diversified. Namely, for example, in accordance with intended use of a customer of an incoming transfer facility, types of the load and operating conditions differ from each other. A distribution system is planned in consideration of safety, reliability, and operation maintainability required by the customer, and increase of future load. In the distribution plan, control of a breaker, disconnecting switch, earth switch, and the like forming the incoming transfer facility, and monitoring and instrumentation of voltage, current, electrical power, and the like, need to be considered.

In this case, it becomes a problem how to reduce an installation space for the above devices and controlling, monitoring, instrumentation, and the like for the devices, and to suppress investment for the installation. There is actually no device and facility responding to this problem.

In view of the above problem, the present invention is achieved. An object of the present invention is to provide a reliable vacuum insulated switchgear flexibly responding to various requests of users.

EXPLANATION OF REFERENCE NUMERALS

1—body, 2—low-voltage control section, 3—high-voltage switch section, 4—bus cable section, 5—bus, 6—cable head, 8—vacuum double-break three-position type switch, 9—earthing switch, 11—operation device

DETAILED DESCRIPTION OF THE PREFERRED EMBODIMENTS

To achieve the above object, a first aspect of the invention is a vacuum insulated switchgear characterized in comprising a vacuum double-break three-position type switch having both of breaking and disconnecting functions.

A second aspect of the invention is the vacuum insulated switchgear characterized in comprising the vacuum double-break three-position type switch having the breaking and disconnecting function, wherein the switch has an isolated-phase structure.

A third aspect of the invention is the vacuum insulated switchgear characterized in comprising: the vacuum double-break three-position type switch having the breaking and disconnecting functions; a line connected to one of fixed contacts of the switch; a bus connected to the other of the fixed contacts of the switch; and a vacuum earthing switch connected to the line.

A forth aspect of the invention is the vacuum insulated switchgear characterized in comprising: the vacuum double-break three-position type switch having the breaking and disconnecting functions; the buses connected respectively to one and the other of the fixed contacts of the switch; and the vacuum earthing switch connected to and between each the buses and each the fixed contacts.

A fifth aspect of the invention is the vacuum insulated switchgear characterized in comprising: the vacuum double-break type switch having a disconnecting function; the line connected to one of the fixed contacts of the switch; an voltage transformer connected to the other of the fixed contacts of the switch; and the vacuum earthing switch connected to and between the other of the fixed contacts of the switch and the voltage transformer.

A sixth aspect of the invention is the vacuum insulated switchgear characterized in comprising: the vacuum double-break type switch having the disconnecting function; the bus connected to one of the fixed contacts of the switch; the voltage transformer connected to the other of the fixed contacts of the switch; and the vacuum earthing switch connected to and between the other of the fixed contacts of the switch and the voltage transformer.

In the eighth aspect of the invention, a seventh aspect of the invention is characterized in that a voltage detector is connected to the line of the vacuum earthing switch.

In the ninth aspect of the invention, a eighth aspect of the invention is characterized in that the voltage detector is connected to the bus of the vacuum earthing switch.

A ninth aspect of the invention is the vacuum insulated switchgear characterized in comprising: the vacuum double-break three-position type switch having the breaking and disconnecting functions and an isolated-phase structure, wherein a distance between electrodes in case of disconnecting in the switch is greater than a distance between electrodes in case of circuit breaking in the switch.

A tenth aspect of the invention is a vacuum insulated switchgear characterized in comprising: the vacuum double-break three-position type switch having the breaking and disconnecting functions and the isolated-phase structure, wherein insulation coordination of the switch among insulation between phases, insulation between electrodes in case of disconnecting, insulation between electrodes in case of current breaking, and insulation between earth electrodes is set as relationship of "the insulation between the phases >the insulation between the electrodes in case of disconnecting >the insulation between the electrodes in case of current breaking >the insulation between the electrodes of the earthing switch."

According to the embodiments of present invention, the reliable vacuum double-break three-position type switch is provided and used to flexibly respond to various requests by the user for a plan of the distribution system.

One of the embodiments of a vacuum insulated switchgear of the present invention is explained below in reference to the drawings.

Figure 1:
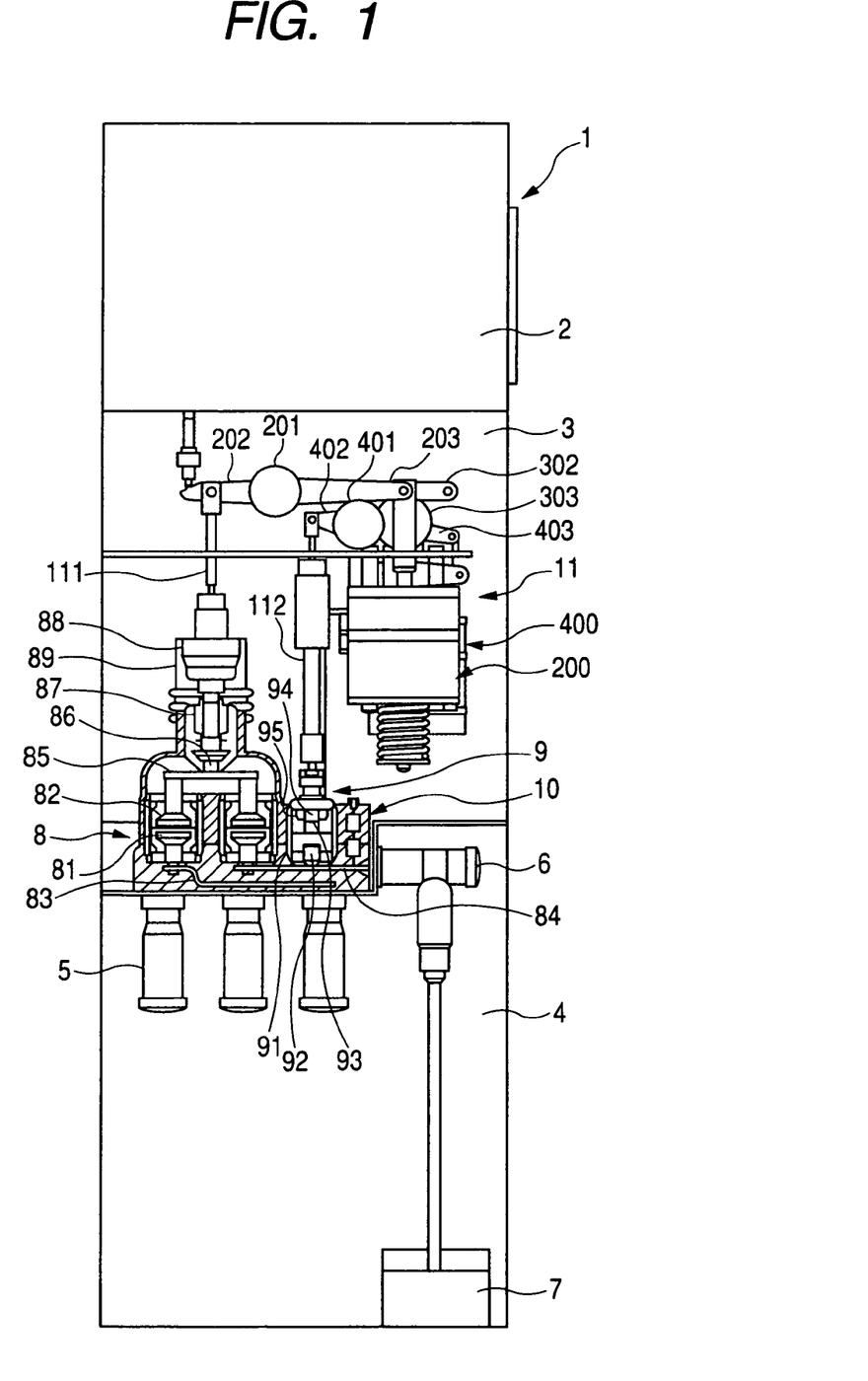
FIG. 1 is a side view showing one embodiment using a vacuum insulated switchgear of the present invention as a feeder panel, by use of its partial cross section.
Figure 2:
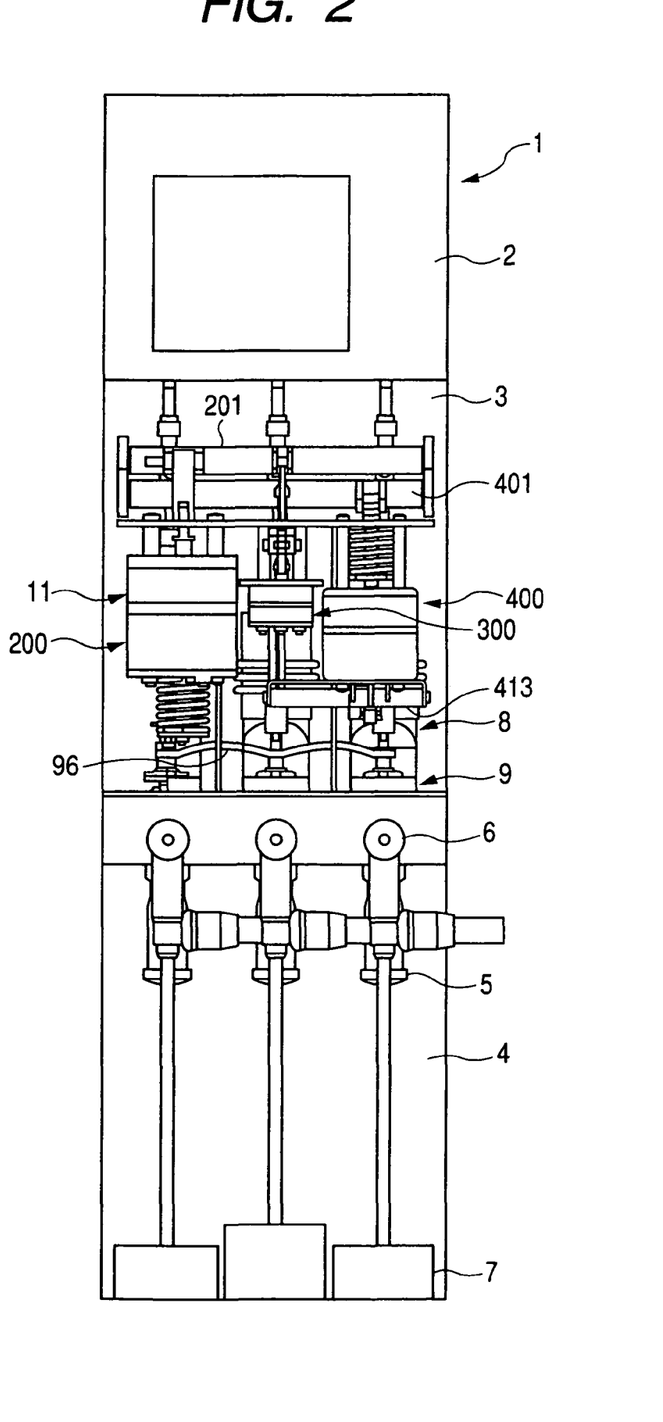
FIG. 2 is a front view showing the embodiment using the vacuum insulated switchgear of the present invention shown in FIG. 1 as the feeder panel, by use of its partial cross section.
Figure 3:
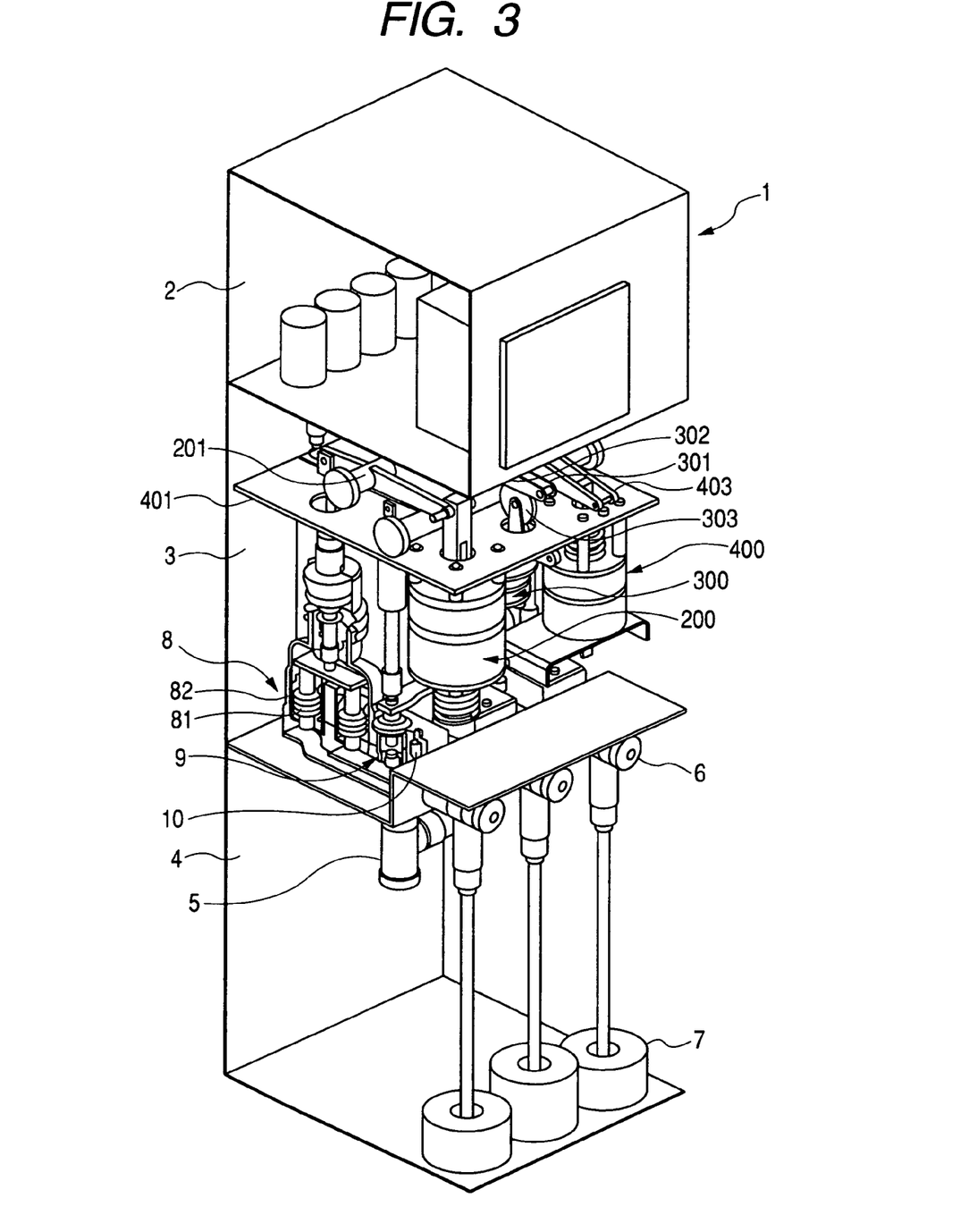
FIG. 3 is a perspective view showing the embodiment using the vacuum insulated switchgear of the present invention shown in FIG. 1 as the feeder panel, by use of its partial cross section.

FIG. 1 is a side view of one embodiment using the vacuum insulated switchgear as a feeder panel. FIG. 2 is a front view of FIG. 1. FIG. 3 is a perspective view of FIG. 2. In these figures, a body 1 comprises a low voltage control section 2, a high voltage switch section 3, and a bus cable section 4.

In the bus cable section 4, solid insulation buses 5, cable heads 6 on a line side, bushings CT 7, and the like are disposed. In the high voltage switch section 3, a vacuum double-break three-position type switch (vacuum double-break three-position type breaking and disconnecting switch BDS) 8, an earth switch (ES) 9 having a vacuum closed container, a voltage detector (VD) 10, and an operation device 11.

The bus 5 uses solid insulation instead of gas, ensuring its handling and safety. The voltage detector 10 detects a corona generated due to degradation of vacuum in BDS, improving maintainability.

Figure 4:
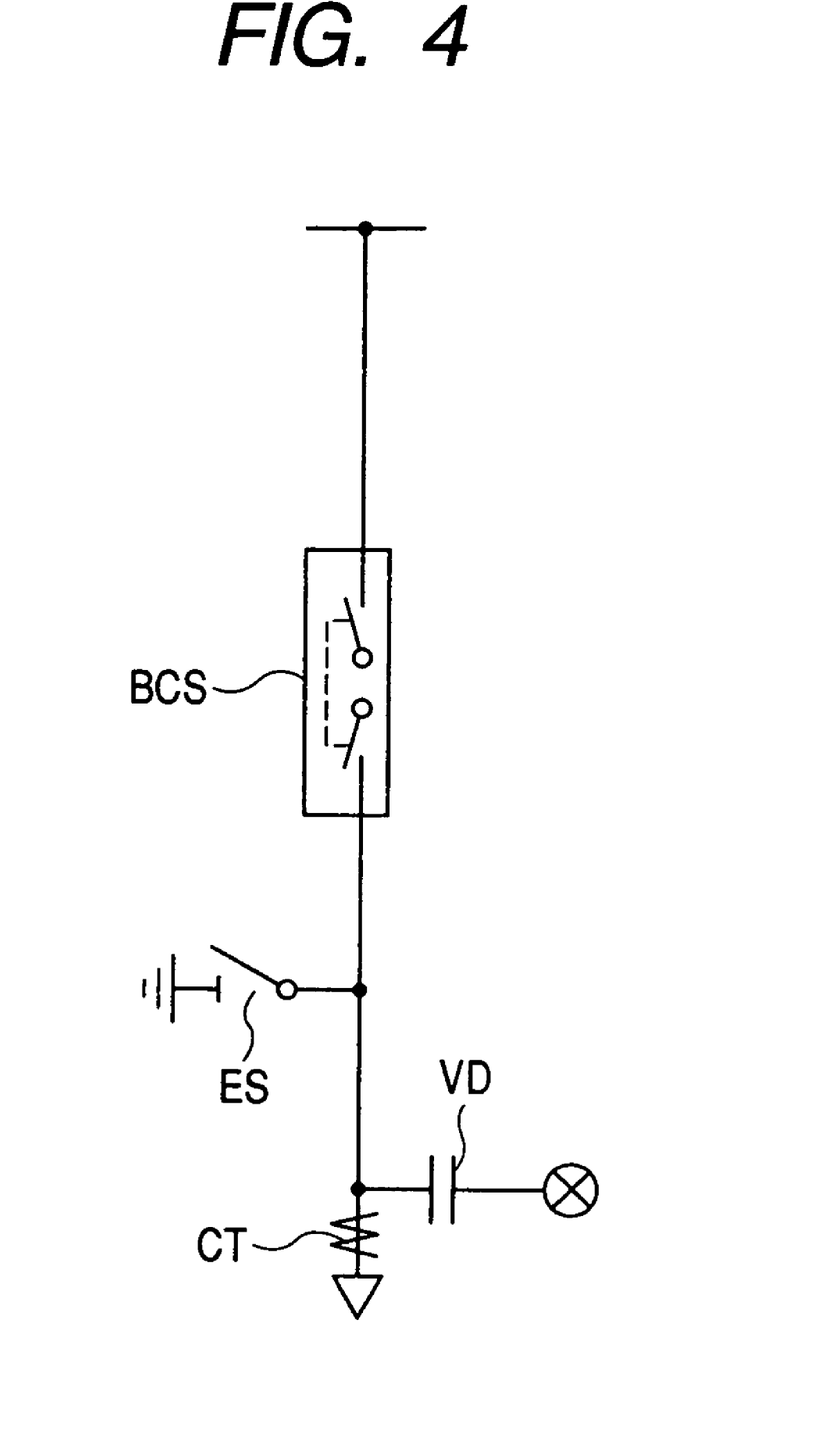
FIG. 4 is a circuit diagram showing the embodiment using the vacuum insulated switchgear of the present invention shown in FIG. 1 as the feeder panel.

FIG. 4 shows an electrical circuit of the embodiment using the above-described vacuum insulated switchgear of the present invention as the feeder panel.

Next, the vacuum double-break three-position type switch (BDS) 8, earth switch (ES) 9 having the vacuum closed container, and voltage detector (VD) 10 disposed in the above-described high voltage switch section 3 are integrally molded of an epoxy resin 12, as shown in FIG. 1. Accordingly, the switch portion is unitized and reduced in size and weight. The unitized switch portion has an isolated-phase structure. Shielding layers are disposed between the phases, inhibiting short-circuit fault. An outer surface of the mold is grounded via conductive coating material applied to the surface, ensuring safety for contact.

Figure 5:
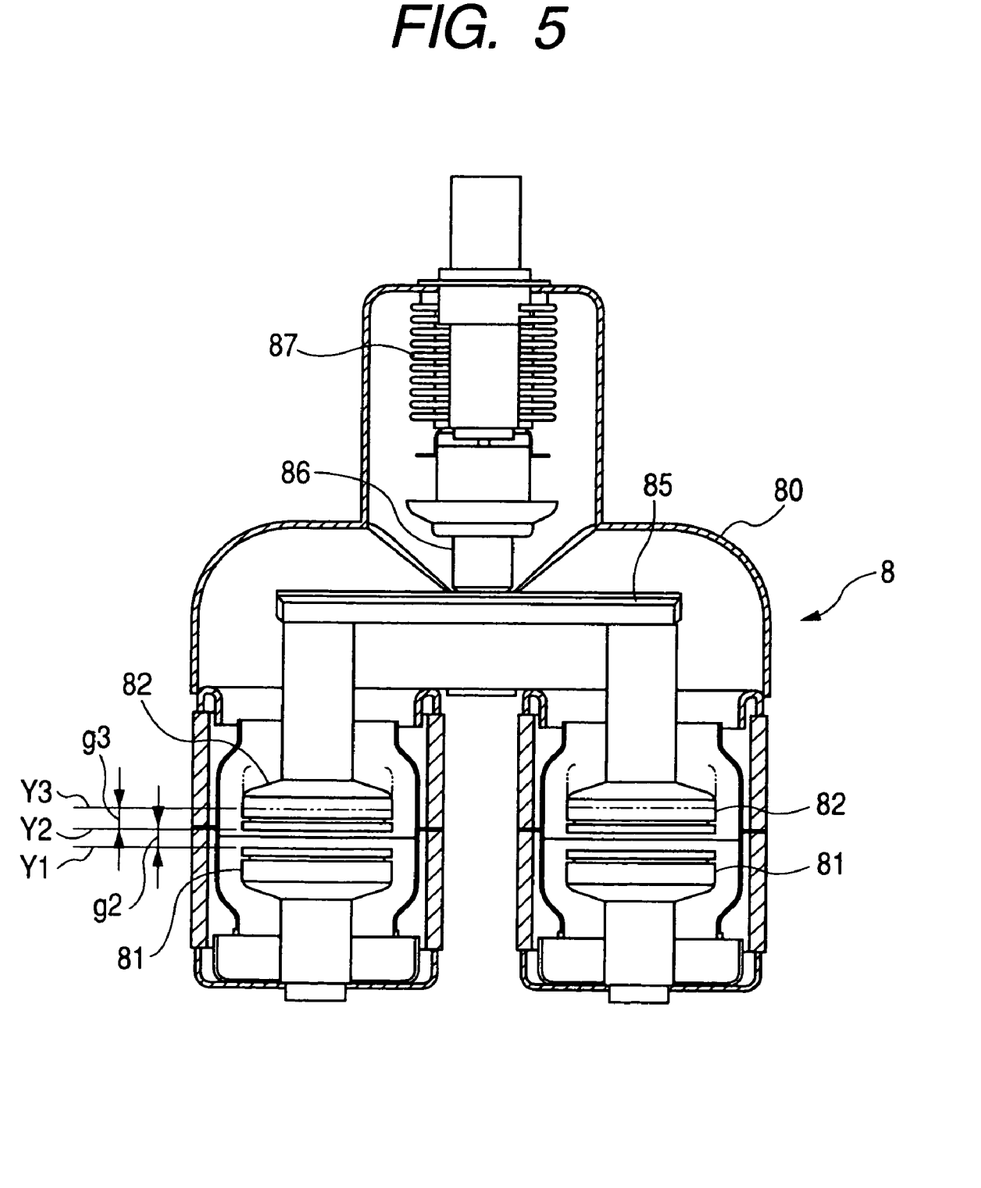
FIG. 5 is a longitudinal cross section view of a switch portion forming the vacuum insulated switchgear of the present invention shown in FIG. 1.

A detailed structure of the unitized switch portion is further explained in reference to FIGS. 1, 5. The vacuum double-break three-position type switch (BDS) 8 comprises a vacuum container 80 having an insulation tube, two fixed contacts 81 contained in the vacuum container 80, and corresponding movable contacts 82, forming the double-break.

One of the fixed contacts 81, on the left of FIG. 1, is connected to the bus 5 via a feeder 83. The other of the fixed contacts 82, on the right of FIG. 1, is connected to the cable head 6 via a feeder 84.

The movable contacts 82 are connected to each other by use of a movable conductor 85 reinforced by, e.g., stainless steel. Stainless steel is a metal, which is not annealed at high temperature. A vacuum insulation operation rod 86 is connected to this movable conductor 85. This vacuum insulation operation rod 86 is introduced out of the vacuum container 80 via metal bellows 87, and connected to an air insulation operation rod 88. This air insulation operation rod 88 is connected to an operation rod 111 operated by the operation device 11. The vacuum container encloses two set of contacts, each set comprising a fixed contact 81 and corresponding movable contact 82 and an insulation tube covering said fixed contact and corresponding movable contact.

As shown in FIG. 5, by use of the operation rod 111, one and the other of the movable contacts 82 stop at a closed position Y1 for conduction, an open position Y2 for breaking current, and a disconnecting position Y3 for ensuring safety of a check operator against surge voltage such as lightning.

As shown in FIG. 5, the above-described two movable contacts 82 ensure a break gap g2 at the open position Y2, and a disconnecting gap g3 at the disconnect position Y3. The disconnecting gap g3 is set to have a distance between the electrodes, the distance being almost twice the break gap g2. As described above, the disconnecting gap g3 in case of disconnect is set to be almost twice the break gap g2. By use of multiple gaps (in this example, two), multistage insulation is possible.

Mold is applied between the phases. Vacuum insulation is applied between the electrodes of the contacts. The above-described distance between the electrodes and the number of the electrodes are changed. Relationship of "insulation between the phases >insulation between the electrodes in case of disconnecting >insulation between the electrodes in case of current breaking >insulation between the electrodes of the earthing switch" is set to achieve insulation coordination between the phases. At least, an accident can be suppressed to single line-to-ground fault. Spread of the accident can be minimized.

As shown in FIG. 1, the above-described air insulation operation rod 88 is covered with bellows 89 made of rubber or metal, and shielded from the air. Accordingly, insulation reliability for prolonged use of the air insulation operation rod 88 is ensured. The above-described vacuum containers 80, 91 and operation rods are made of stainless steel, improving their environment resistance.

As shown in FIG. 1, the earthing switch (ES) 9 having the vacuum closed container comprises a vacuum container 91 having an insulation tube, fixed contacts 92 fixed in the vacuum container 91 and connected to the feeder 84, and corresponding movable contacts 93. An earthed rod 94 is connected to this movable contacts 93. This vacuum insulation operation rod 94 is introduced out of the vacuum container 91 via metal bellows 95, and connected to the insulation operation rod 112 for the earth switch. As shown in FIG. 2, the movable contacts 93 are connected to each other via an earthed conductor 96. The container 91 is made of ceramics and the rod 94 is earthed and made of copper.

Figure 6:
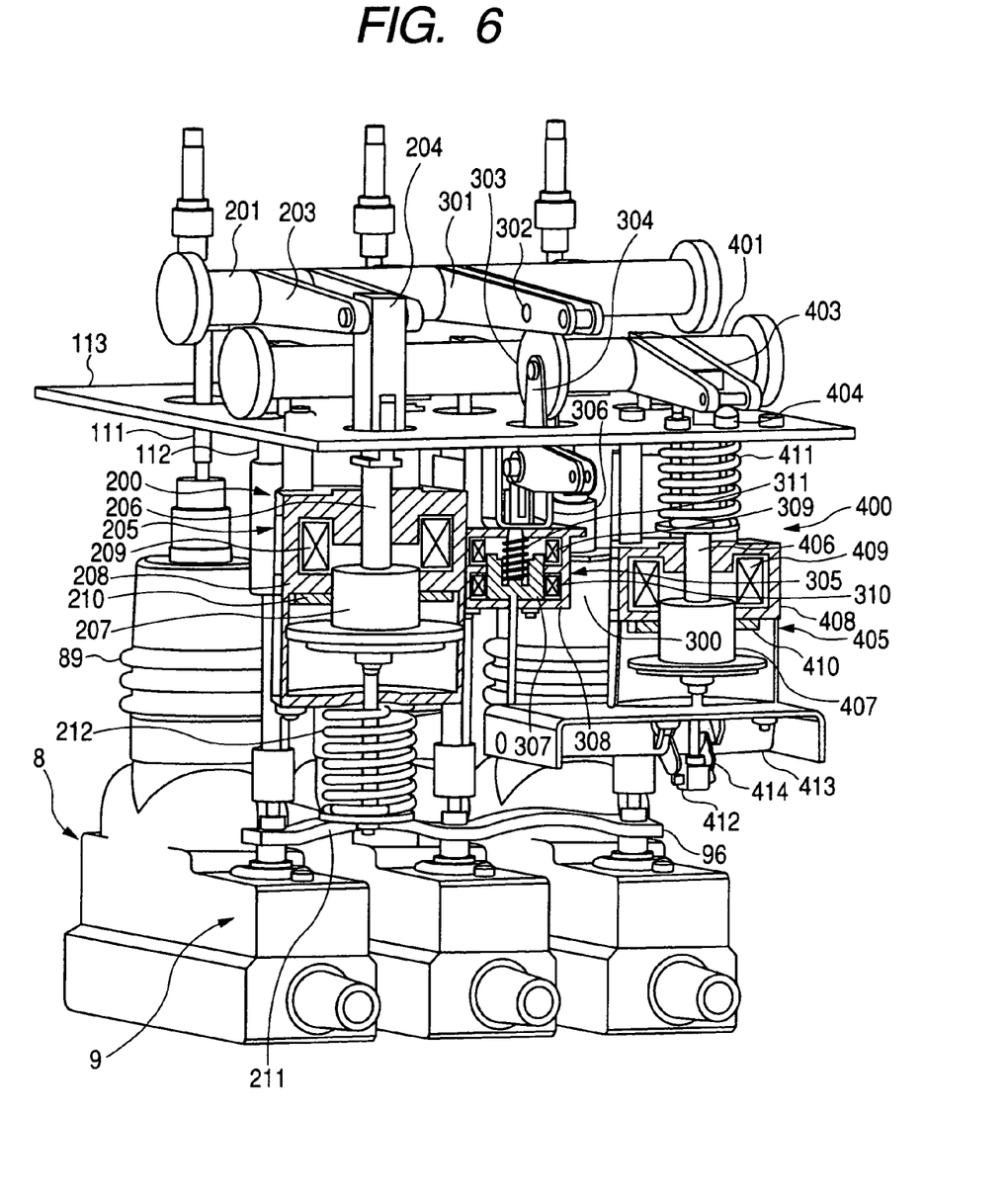
FIG. 6 is an enlarged perspective view showing the embodiment of the switch portion and its operating mechanism forming the vacuum insulated switchgear of the present invention shown in FIG. 1, by use of its partial cross section.

Next, a detailed structure of the operation device 11 is explained in reference to FIG. 6. The operation device 11 operates switch in the switch 8 to the closed position Y1 for conduction, the open position Y2 for breaking current, and the disconnecting position Y3 for ensuring safety of a check operator against surge voltage such as lightening. The operation device 11 operates switch of the earthing switch 9.

Components of the operation device 11 are fixed to a support plate 113 provided in the high voltage switch section 3. The operation device 11 roughly comprises a first operation mechanism 200 for switching the movable contacts 82 of the switch 8 between the closed position Y1 and open position Y2, a second operation mechanism 300 for switching the movable contacts 82 of the switch 8 between the open position Y2 and disconnect position Y3, and a third operation mechanism 400 for operating the movable contacts 93 of the earth switch 9.

First, a structure of the first operation mechanism 200 is explained in reference to FIG. 6. In FIG. 6, a first shaft 201 is rotatably supported by the support plate 113. As shown in FIG. 1, three levers 203 are axially fixed to this first shaft 201. Distal ends of the levers 203 are connected to operation rods 111. As shown in FIG. 6, the lever 203 is fixed to one side of the first shaft 201 oppositely to the levers 202 shown in FIG. 1.

As shown in FIG. 6, a driving shaft 206 of an electromagnet 205 is connected to the lever 203 via a connection member 204. A movable iron core 207 having a T-shaped cross section is fixed to the driving shaft 206. A fixed iron core 208 fixed to the support plate 113 is arranged around this movable iron core 207. A coil 209 and circular permanent magnet 210 are disposed inside the fixed iron core 208. A trip spring bearing 211 is provided to the driving shaft 206 oppositely to the lever 203. A trip spring 212 is arranged between the trip spring bearing 211 and fixed iron core 208.

When the movable contacts 82 are retained at the closed position Y1, this electromagnet 205 obtains retention force against stored energy of the trip spring 212 and of contact pressure springs (not shown) provided to the air insulation operation rod 88 by means of attraction of the coil 209 and permanent magnet 210. In particular, the attraction of the permanent magnet 210 forms a so-called magnetic latch method.

Next, a structure of the second operation mechanism 300 for switching the movable contacts 82 of the switch 8 between the open position Y2 and disconnect position Y3 is explained in reference to FIG. 6. A lever 301 is fixed to a longitudinal middle portion of the first shaft 201 on the support plate 113. An interlock pin 302 is provided distally of this lever 301. A roller 303 abuts this pin 302. This roller 303 is rotatably provided to one end of a crank lever 304. This crank lever 304 is rotatably supported on a side of a lower surface of the support plate 113.

A driving shaft 306 of an electromagnet 305 is connected to the other end of the crank lever 304. A movable iron core 307 is fixed to the driving shaft 306. A fixed iron core 308 fixed to the support plate 113 is arranged around this movable iron core 307. Coils 309, 310 are disposed vertically in the fixed iron core 308. A return spring 311 is disposed between the movable iron core 307 and an upper portion of the fixed iron core 308.

The above-described electromagnet 305 energizes the coils 309, 310 to move the movable iron core 307 vertically. This movement causes the crank lever 304 to rotate. This rotation of this clank lever 304 causes an abutment position of the interlock pin 302 and roller 303 to change, so that rotation of the lever 203 about the first shaft 201 is prevented or made possible. Accordingly, the movable contacts 82 of the switch 8 are prevented from moving from the open position Y2 to the disconnecting position Y3, and retained at the open position Y2, or can move from the open position Y2 to the disconnecting position Y3. Namely, this structure is a first interlock mechanism between the open position Y2 and disconnecting position Y3 of the movable contacts 82 of the switch 8.

Next, a structure of the third operation mechanism 400 for operating the movable contacts 93 of the earthing switch 9 is explained particularly in reference to FIG. 6. A second shaft 401 is rotatably supported by the support plate 113. As shown in FIG. 1, three levers 402 are fixed axially to a first shaft 401. Distal ends of these levers 402 are connected to operation rods 112, respectively. As shown in FIG. 6, a lever 403 is fixed to one side of the second shaft 401 oppositely to the levers 402.

As shown in FIG. 6, a driving shaft 406 of an electromagnet 405 is connected to the lever 403 via a connection member 404. This electromagnet 405 has the same structure as the electromagnet 205 of the above-described first operation mechanism 200. A movable iron core 407 having a T-shaped cross section is fixed to the driving shaft 406. A fixed iron core 408 fixed to the support plate 113 is arranged around this movable iron core 407. A coil 409 and a circular permanent magnet 410 are disposed in the fixed iron core 408. A spring 411 for break is arranged between the fixed iron core 408 and the lower surface of the support plate 113.

A second interlock mechanism is provided between the third operation mechanism 400 of the earth switch 9 and the second operation mechanism 300 for switching the movable contacts 82 of the switch 8 between the open position Y2 and disconnecting position Y3.

In this second interlock mechanism, when the movable contacts 82 in the switch are at a three-position of the disconnecting position Y3 for ensuring safety of a check operator against surge voltage such as lightening, the movable contacts 93 in the earthing switch 9 and fixed contacts can be closed by means of the electromagnet 405. Additionally, when the movable contacts 82 in the switch are at a two-position of the open position Y2 for breaking current, the movable contacts 93 in the earthing switch 9 and the fixed contacts cannot be closed by means of the electromagnet 405. Further, when the movable contacts 93 and the fixed contacts of the earthing switch 9 has been closed, operation of the electromagnet 205 in the second operation mechanism 300 is made impossible.

Concretely, this second interlock mechanism comprises: a pin 412 provided to a lower end of the driving shaft 406 of the electromagnet 405 in the third operation mechanism 400; a shaft 413 provided in parallel to the second shaft 401 under the electromagnet 305 in the second operation mechanism 300; a lever (not shown) provided to the shaft 413 and connected to a lower end of the driving shaft 306 of the electromagnet 305 in the second operation mechanism 300; and a lever 414 provided to the shaft 413 and engaged with the pin 412.

Next, operation of the embodiment using the above-described vacuum insulated switchgear of the present invention as a feeder panel is explained in reference to FIGS. 1 to 6.

When the movable contacts 82 in the switch 8 are set at the open position Y2 for breaking current, the lever 203 in the first operation mechanism 200 is provided with clockwise rotary force about the first shaft 201 as a fulcrum by means of return force of the trip spring 212 in the first operation mechanism 200, as shown in FIG. 1.

Accordingly, the interlock pin 302 provided distally of the lever 301 forming the second operation mechanism 300 abuts a peripheral upper surface of the roller 303. Further clockwise rotation of the roller 303 by the return force of the trip spring 212 is suppressed. Namely, switch from the open position Y2 for breaking current to the disconnecting position Y3 for ensuring safety of a check operator against surge voltage such as lightening, is prevented.

Next, operation (closing operation) from the open position Y2 to the closed position Y1 by the first operation mechanism 200 1 is explained.

When the coil 209 of the electromagnet 205 of the first operation mechanism 200 is energized, the driving shaft 206 moves upward in FIG. 6. As shown in FIG. 1, because of the upward movement of this driving shaft 206, the levers 202 rotate counterclockwise about the first shaft 201 as a fulcrum to move the movable contacts 82 toward the closed position Y1. In this closed state, the trip spring 212 and contact pressure springs store energy to prepare for opening the electrodes.

Because of this closing operation, the interlock pin 302 is separate from a peripheral surface of the roller 303. The roller 303 does not move, and is retained at an initial position by the return spring 311 in the second operation mechanism.

As described above, in view of needs for enhancing safety, the second operation mechanism 300 forms a mechanical interlock mechanism so that the disconnecting operation by the first operation mechanism 200 is made impossible when the switch 8 is in the closed state. Namely, the operation that "the disconnecting operation is made impossible when the movable contacts are at the closed position," which is one of mechanical interlocks between break and disconnect, is achieved.

Next, operation from the closed position Y1 to the open position Y2 (electrode opening operation) by the first operation mechanism 200 is explained.

When the coil 209 of the electromagnet 205 in the first operation mechanism 200 is energized in an opposite direction to the closing operation to cancel magnetic flux of the permanent magnet 210, the driving shaft 206 moves downward by stored energy of the trip spring 212 and contact pressure springs, as shown in FIG. 1. Because of this downward movement of the driving shaft 206, the lever 301 rotates clockwise via the lever 203 and first shaft 201, as shown in FIG. 1. The clockwise rotation of the lever 301 is prevented by abutment between the interlock pin 302 in the second operation mechanism and the peripheral upper surface of the roller 303. As a result, the movable contacts 82 of the switch 8 can be retained at the open position Y2.

Next, operation from the open position Y2 to the disconnecting position Y3 by the second operation mechanism 300 is explained.

In a state where the above-described switch 8 is open, when the coil 309 above the electromagnet 305 in the second operation mechanism 300 is energized, the driving shaft 306 moves upward against the return spring 311. Because of the upward movement of the driving shaft 306, the roller 303 rotates clockwise in FIG. 1 via the crank lever 304. Because of the clockwise rotation of the roller 303, an abutment position between the roller 303 and interlock pin 302 moves downward. As a result, the operation rods 111 move upward via the first shaft 201 and levers 202, and the movable contacts 82 of the switch 8 move to the disconnecting position Y3.

In this disconnected state, the movable iron core 207 of the electromagnet 205 in the first operation mechanism 200 is under the permanent magnet mount 210. Accordingly, even in the event of energizing the coil 209 of the electromagnet 205 in the first operation mechanism 200 in the disconnected state, there is almost no magnetic flux passing through the movable iron core 207, generating no attraction. Namely, a mechanical interlock that "closing operation is made impossible when the movable contacts are at the disconnect position" is achieved between the breaker and disconnecting switch.

Next, operation from the disconnecting position Y3 to the open position Y2 by the second operation mechanism 300 is explained.

In the disconnected state, when the coil 310 under the electromagnet 305 in the second operation mechanism 300 is energized, the driving shaft 306 moves downward and the crank lever 304 rotates counterclockwise, so that the roller 303 pushes upward the interlock pin 302 abutting the roller 303. Accordingly, the movable contacts 82 of the switch 8 move to the open position Y2.

Next, when the movable contacts 82 of the switch 8 are at the open position Y2 for breaking current, the lever 414 in the second interlock mechanism engages the pin 412 provided to a lower end of the driving shaft 406 of the electromagnet 405 in the third operation mechanism 400. Accordingly, because of the electromagnet 405, the movable contacts 93 of the earth switch 9 cannot be closed.

When the fixed contacts and movable contacts 93 of the earthing switch 9 are closed, the lever 414 in the second interlock mechanism engages the pin 412 provided to a lower end of the driving shaft 406 of the electromagnet 405. Accordingly, the operation by the second operation mechanism 300 is made impossible. Further, when the movable contacts 82 of the switch 8 are at the disconnecting position Y3 for ensuring safety of a check operator against surge voltage such as lightening, the lever 414 in the second interlock mechanism enables the pin 412 provided to the lower end of the driving shaft 406 of the electromagnet 405 to move. Accordingly, in the third operation mechanism 400, the earth switch 9 can be closed.

In the above-described embodiment, the rotatable roller 303 is used in the second operation mechanism 300. The roller 303 can be a partially-circular cam. The first operation mechanism 200 and third operation mechanism 400 can be changed properly. The first operation mechanism 200 uses a solenoid operation method. The first operation mechanism 200 can also use other operation methods such as an electrical spring method.

According to the above-described embodiment of the present invention, the vacuum insulated switchgear can be reduced in size and weight. Further, capability and reliability of the vacuum insulated switchgear can be improved. By use of the compact and light vacuum insulated switchgear, a feeder panel can be provided in accordance with requests of a user.

Figure 7:
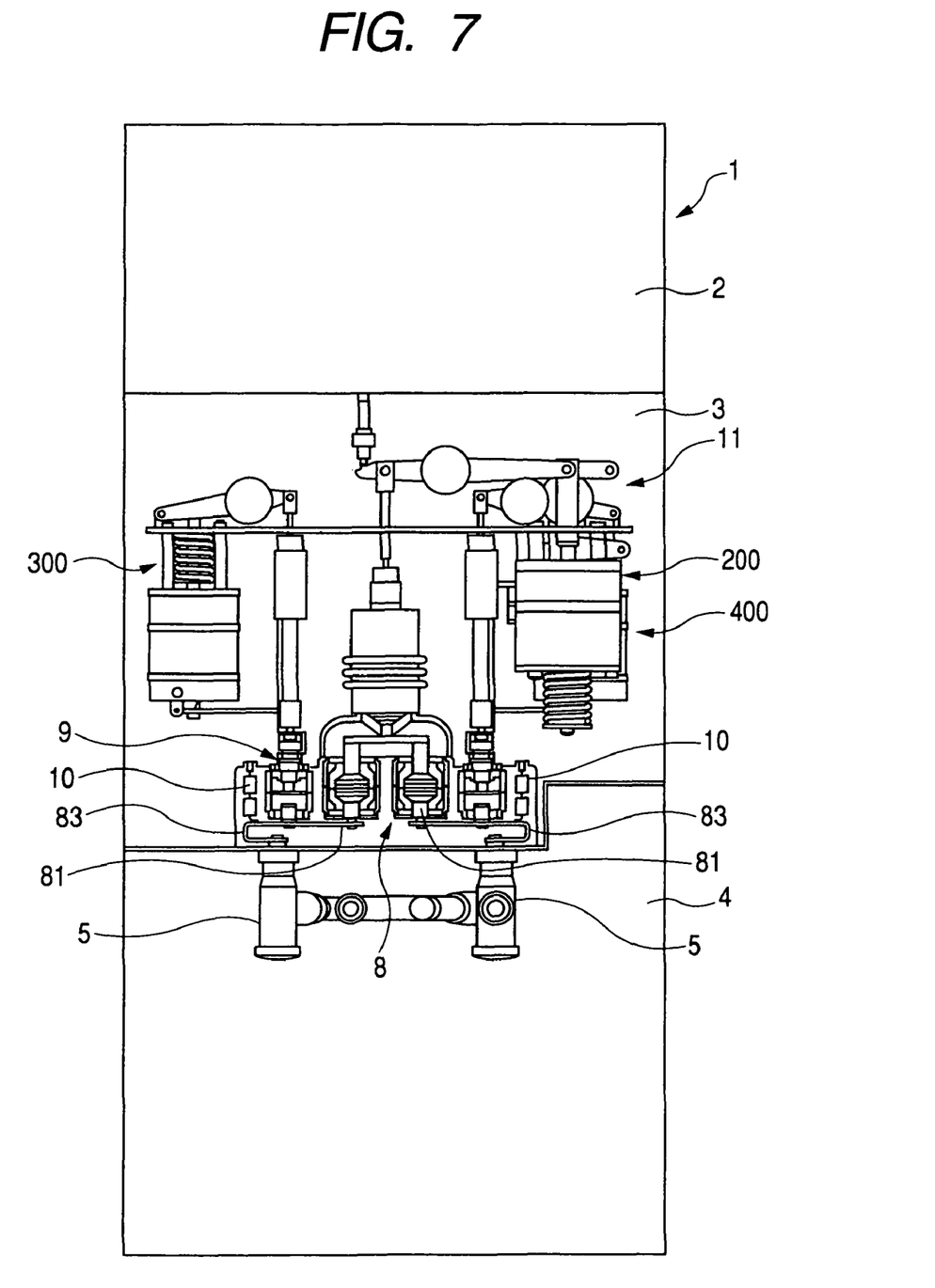
FIG. 7 is a side view of one embodiment using the vacuum insulated switchgear of the present invention as a bus sectionalizing panel, by use of its partial cross section.
Figure 8:
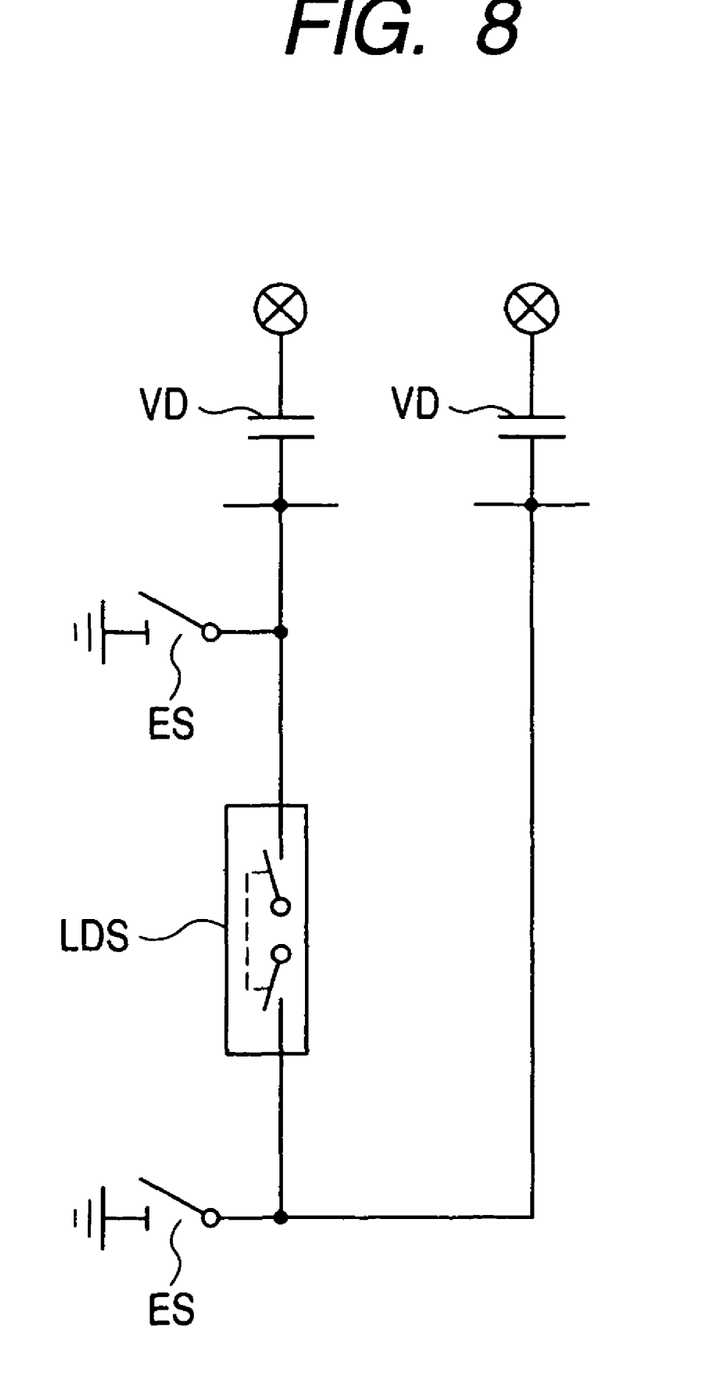
FIG. 8 is an electrical circuit diagram of the embodiment using the vacuum insulated switchgear of the present invention shown in FIG. 7 as the bus sectionalizing panel.

FIGS. 7 and 8 show one embodiment using the vacuum insulated switchgear of the present invention as a bus sectionalizing panel. FIG. 7 is a side view of the embodiment using the vacuum insulated switchgear of the present invention as the bus sectionalizing panel. FIG. 8 is a diagram of an electrical circuit of the embodiment. In these figures, components having the same numerals as in FIGS. 1 to 6 are the same as or correspond to the components in FIGS. 1 to 6 having the same numerals.

In this embodiment, the vacuum double-break three-position type switch 8 is used as a vacuum double-break three-position type load breaking and disconnecting switch (LDS). The fixed contacts 81 of the switch 8 are connected to the solid insulation buses 5 by use of the conductors 83. The earth switch 9 is connected to the conductors 83.

Figure 9:
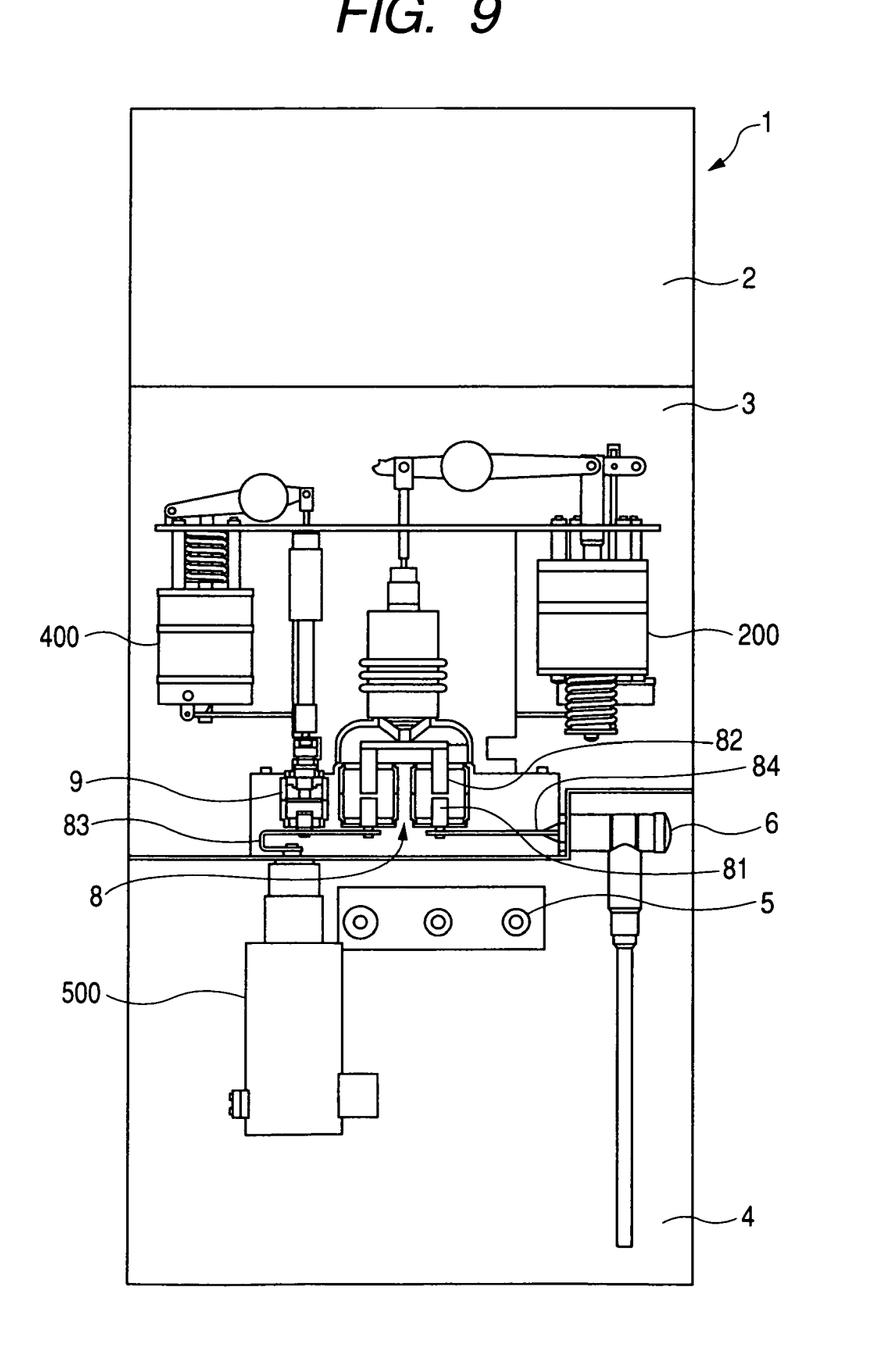
FIG. 9 is a side view of one embodiment using the vacuum insulated switchgear of the present invention shown in FIG. 7 as a feeder panel, by use of its partial cross section.
Figure 10:
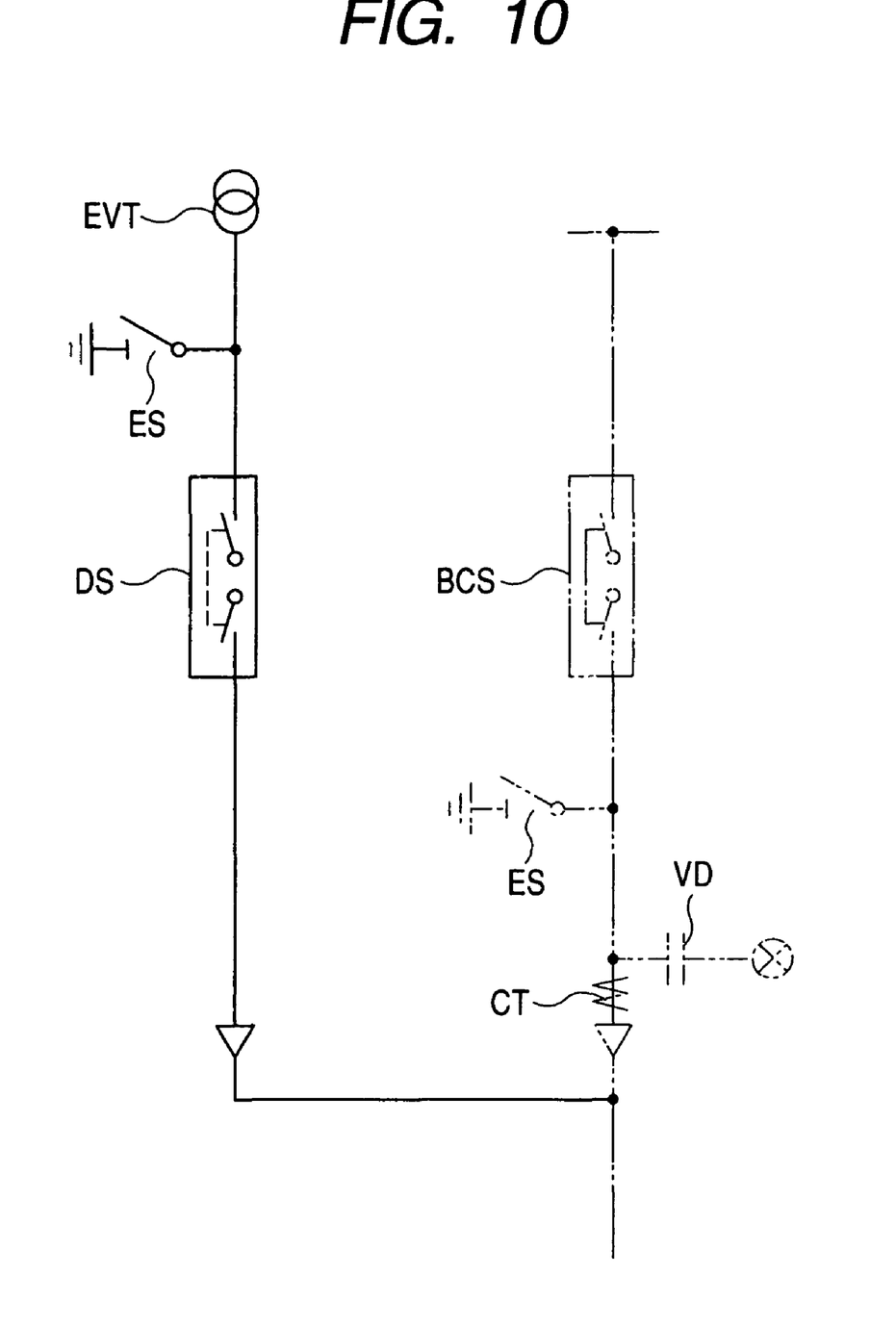
FIG. 10 is an electrical circuit diagram of the embodiment using the vacuum insulated switchgear of the present invention shown in FIG. 9 as the feeder panel.

FIGS. 9 and 10 show one embodiment using the vacuum insulated switchgear of the present invention as a feeder instrument panel. FIG. 9 is a side view of the embodiment using the vacuum insulated switchgear of the present invention as the feeder instrument panel. FIG. 10 is a diagram of an electrical circuit of the embodiment. In these figures, components having the same numerals as in FIGS. 1 to 6 are the same as or correspond to the components in FIGS. 1 to 6 having the same numerals.

In this embodiment, the vacuum double-break three-position type switch 8 is used as a vacuum disconnect switch (DS). One (right side of FIG. 9) of the fixed contacts 81 of the switch 8 is connected to a single phase coil type voltage transformer 500 in the bus cable section 4 by use of the conductor 83. The earthing switch 9 is connected to the conductor 83.

Figure 11:
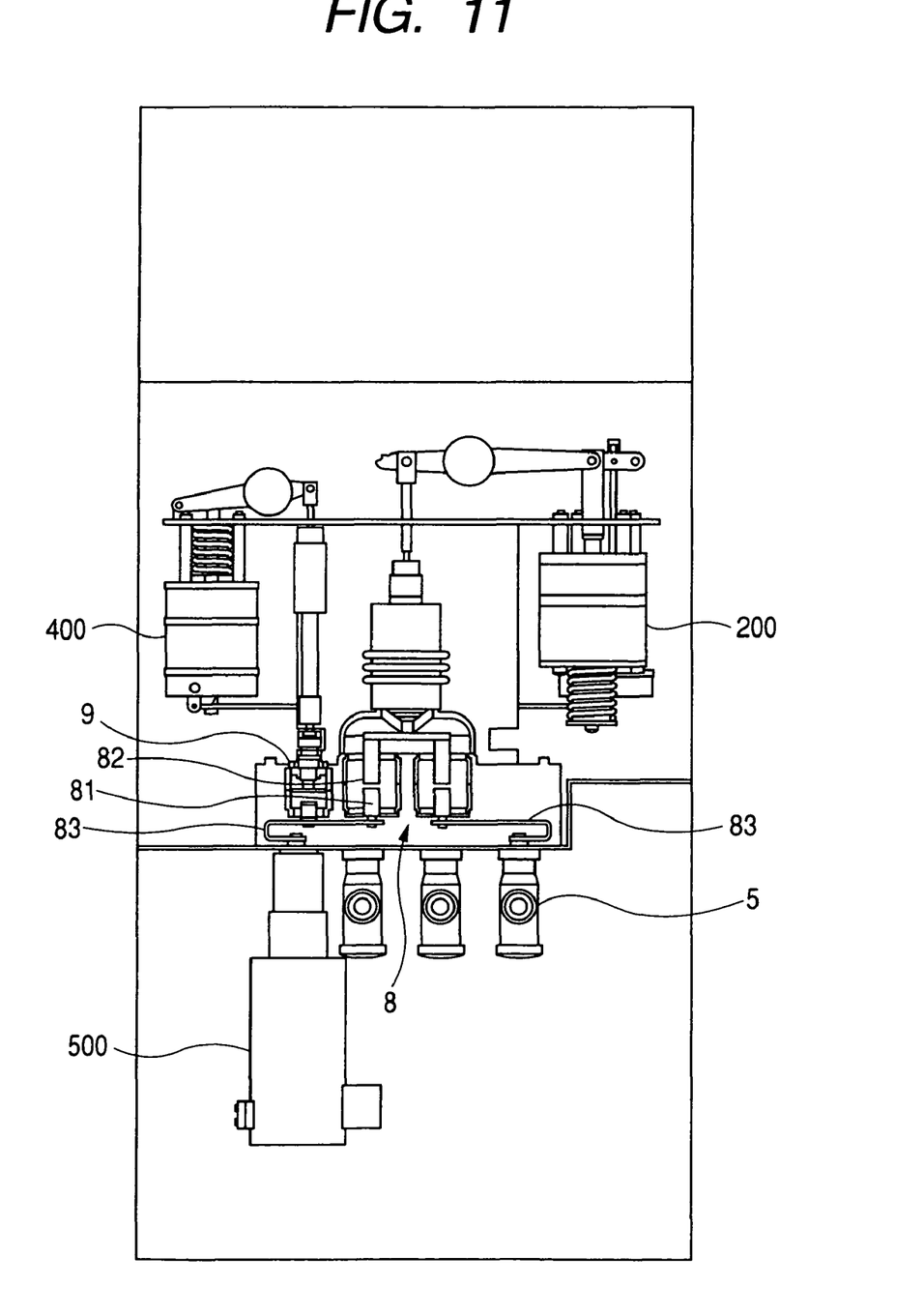
FIG. 11 is a side view of one embodiment using the vacuum insulated switchgear of the present invention as a bus instrument panel, by use of its partial cross section.
Figure 12:
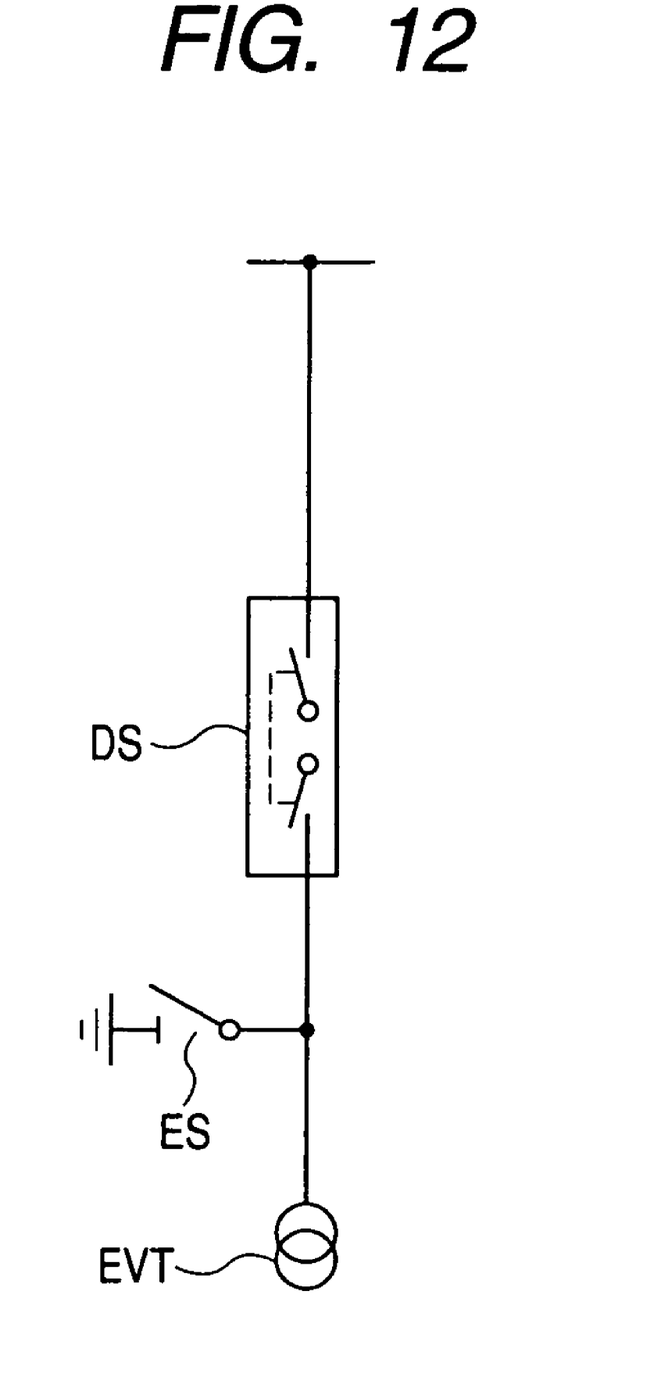
FIG. 12 is an electrical circuit diagram of the embodiment using the vacuum insulated switchgear of the present invention shown in FIG. 11 as the bus instrument panel.

FIGS. 11 and 12 show one embodiment using the vacuum insulated switchgear of the present invention as a bus instrument panel. FIG. 11 is a side view of the embodiment using the vacuum insulated switchgear of the present invention as the bus instrument panel. FIG. 12 is a diagram of an electrical circuit of the embodiment. In these figures, components having the same numerals as in FIGS. 1 to 6 are the same as or correspond to the components in FIGS. 1 to 6 having the same numerals.

In this embodiment, the vacuum double-break three-position type switch 8 is used as a vacuum disconnect switch (DS). One (right side of FIG. 11) of the fixed contacts 81 of the switch 8 is connected to the single phase coil type voltage transformer 500 in the bus cable section 4 by use of one of the conductors 83. The other (left side of FIG. 11) of the fixed contacts 81 of the switch 8 is connected to the solid insulation bus 5 by use of the other of the conductors 83. The earth switch 9 is connected to the former of the conductors 83.

According to the above-described embodiment of the present invention, because the vacuum double-break three-position type switch can be used as the break disconnect switch or disconnect switch, the present invention can respond to various requests of a user flexibly. The present invention achieves excellent handling and scalability.

According to the above-described embodiment of the present invention, in the structure of the vacuum double-break three-position type switch, a dual system of the break portion and disconnecting portion can be achieved. Reliability of the system is increased.

According to the above-described embodiment of the present invention, because the primary circuit has a complete isolated-phase structure, short-circuit faults can be minimized. Because the switch has a double insulation structure of vacuum and mold, ground faults due to vacuum leak can be avoided. The insulation coordination of the switch is set as the relationship of "insulation between the phases >insulation between the electrodes in case of disconnecting >insulation between the electrodes in case of current breaking >insulation between the electrodes of the earth switch." At least, an accident can be suppressed to single line-to-ground fault. Spread of the accident can be minimized. Because of the above reasons and others, the present invention is excellent in safety.

What is claimed is:

1. A vacuum insulated switchgear, comprising:
a body having a low voltage control section, a high voltage switch section, and a bus cable section which are partitioned by earthing metal plates;
a vacuum switch having a vacuum container containing two sets of contacts, each set comprising a fixed contact and corresponding movable contact and an insulation tube covering said fixed contact and corresponding movable contact; the movable contacts stopping at a closed position, an open position and a disconnect position; and
a pair of vacuum earth switches, each having a separate vacuum container containing fixed contact, corresponding movable contact and an insulation tube covering the fixed contacts and the movable contacts;
wherein the vacuum switch and the vacuum earth switches are integrally molded and disposed in the high voltage switch section; and
a bus and/or a cable which is disposed in the bus cable section of the body.

2. The vacuum insulated switchgear according to claim 1, which further comprises:
buses, which are connected to one fixed contact of the vacuum switch and the other of the fixed contact of the switch, respectively, and disposed within the bus cable section, wherein
the vacuum earth switches are connected between the respective buses and the respective fixed contacts and disposed within the high voltage switch section.

3. The vacuum insulated switchgear according to claim 2, further comprising: a voltage detector that is connected to the bus side of the vacuum earthswitch and disposed within the high voltage switch section.

* * * * *